United States Patent Office 3,176,764
Patented Apr. 6, 1965

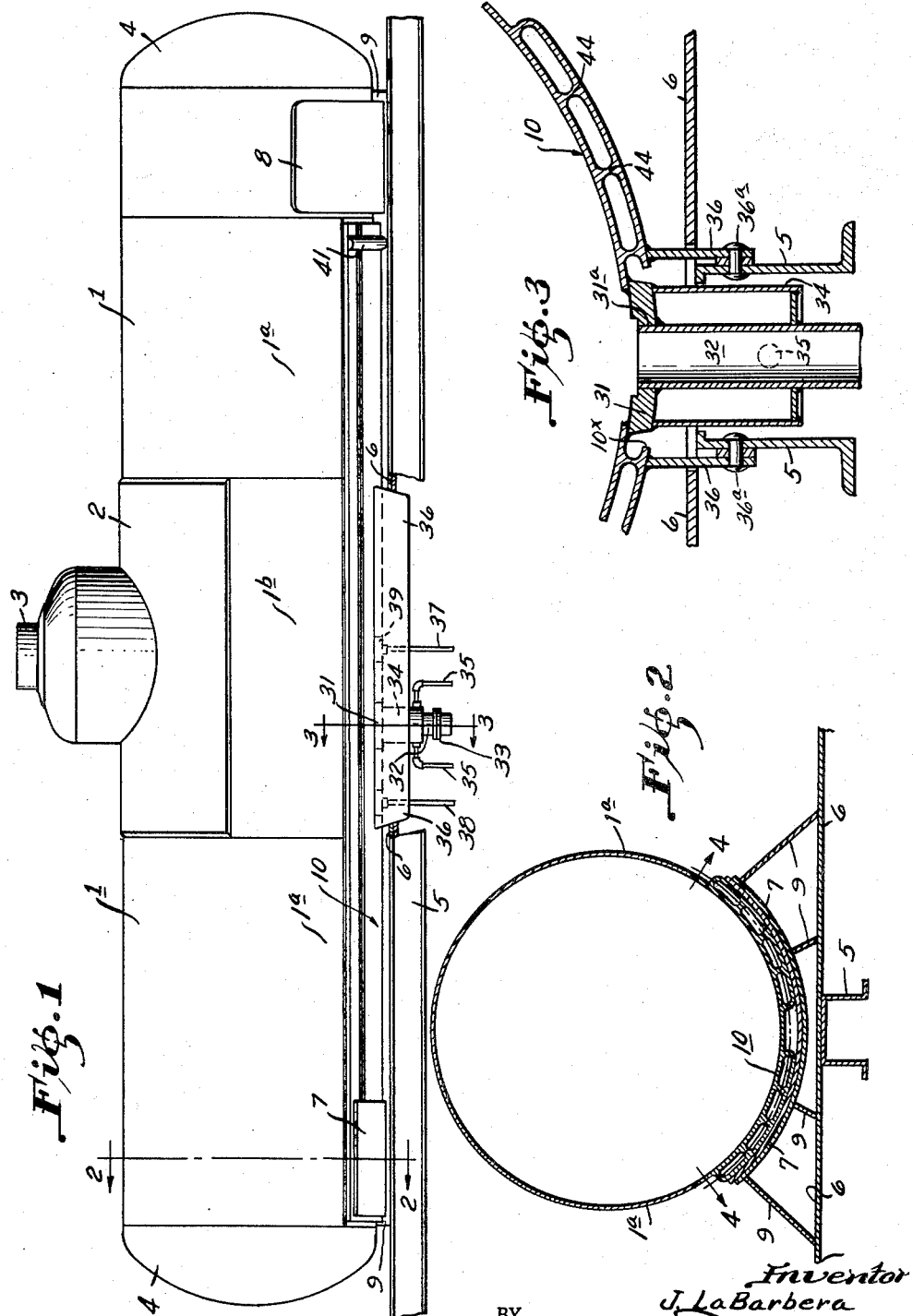

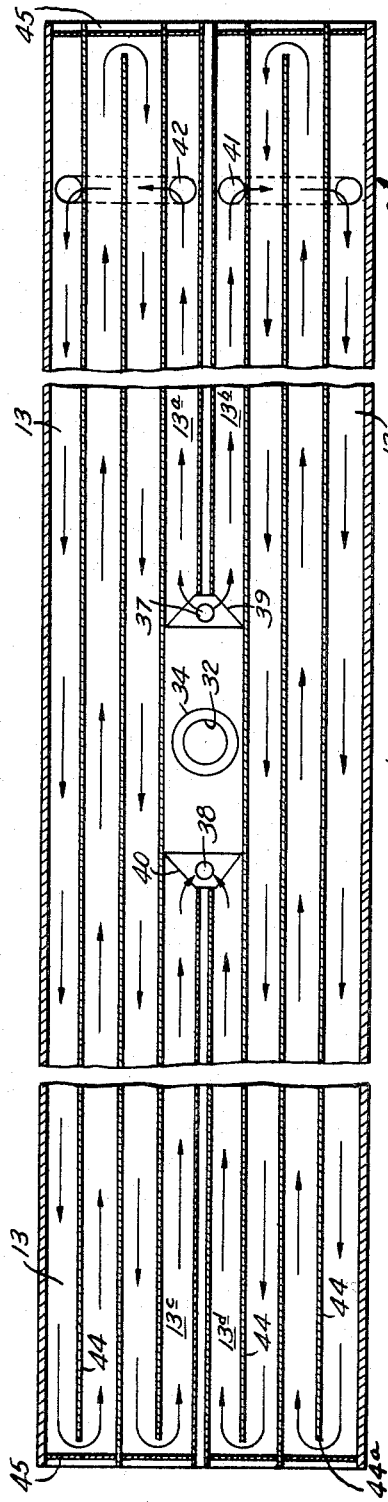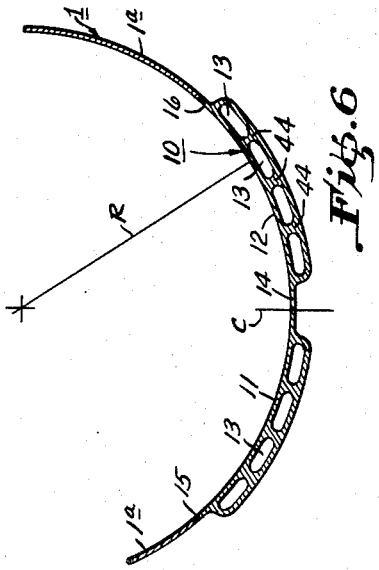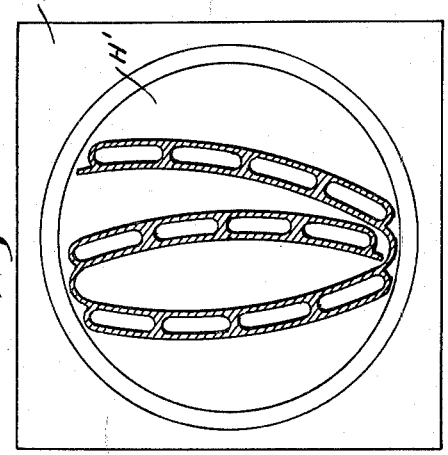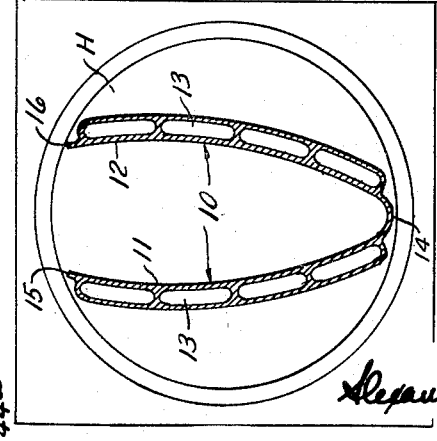

3,176,764
INTEGRAL TANK SHELL HEAT-EXCHANGE COILS
Joseph La Barbera, Shreveport, La., assignor to The J. B. Beaird Company, Inc., a corporation of Louisiana
Filed Jan. 26, 1961, Ser. No. 85,105
4 Claims. (Cl. 165—168)

This invention relates to a method of making tank wall sections having integral tubes forming heat-exchange ducts, and to tanks formed by joining together one or more sections of walls made by the above method, or by joining them with other types of walls to fabricate enclosed vessels having integrally-formed heat-exchange tubes.

It is the principal object of the invention to provide a method of making integral-coil tank wall sections wherein each section is made in whatever length may be desired, and these sections having relatively large transverse dimensions. In particular, it is a principal object of this invention to provide a way of making extruded integral-coil tank wall sections having transverse dimensions considerably greater than the maximum dimension of the extrusion die which makes the section. The present method teaches the extrusion of each section in partly folded form, and the subsequent unfolding of the partly-folded extrusions to provide a wall section of larger transverse extent, the word "transverse" in this specification referring to a direction or plane disposed normal to the direction of extrusion of the wall section or sections.

It is another important object of this invention to provide a way of enclosing the ends of a plurality of longitudinally extending extruded ducts to provide a tortuous path through these ducts for a fluid to flow in heat-exchange relation with the contents of the tank of which the integral-coil wall section is a part.

Still another major object is to provide a novel way of making a large tank having integral heat-exchange ducts, such as is used to form a vehicular tank-car for example. By making one or more tank-wall sections by extrusion, these sections can be made in any length commensurate with the desired length of the tank, this feature lending a degree of flexibility to the present method of manufacture which is not provided by prior art casting methods such as that shown in expired U.S. Patent 1,856,338. The present extrusion method also provides tank-wall sections which require far less fitting and welding to build a complete tank than prior art methods employing casting techniques, or fabrication of wall sections by welding parts together to form a composite heat-exchange tank wall structure. Moreover, aluminum extrusions provide better heat-exchange conduction and a far lighter-weight structure for a tank, this being particularly important in connection with the use and transporting of vehicular tanks.

It is a further important object of the invention to provide an improved tank structure including integally-formed heat-exchange ducts extending longitudinally of the tank, and the adjacent ducts being separated by intermediate web portions which form tank strengthening ribs, particularly advantageous to strengthen the undersides of vehicular tanks.

Other objects and advantages of this invention will become apparent during the following discussion of the drawings, wherein:

FIG. 1 is a side elevation of a tank made according to the present invention and supported on a platform shown partly in cross-section;

FIG. 2 is an enlarged sectional view taken along line 2—2 of FIG. 1;

FIG. 3 is an enlarged sectional view taken along line 3—3 of FIG. 1;

FIG. 4 is a sectional view taken along line 4—4 of FIG. 2;

FIG. 5 is an axial end view of an extruder head showing in cross-section a tank-wall section being extruded therefrom in partly-folded condition;

FIG. 6 is a cross-sectional view through a vessel showing the extruded wall section of FIG. 5 opened up to the diameter of the tank from the partly-folded condition in which it is extruded;

FIG. 7 is a sectional view through a part of an extruded wall section having integral ducts of different cross-sectional shape than the ducts shown in the other figures; and FIG. 8 is a view smilar to FIG. 5, but showing the extrusion of three partly folded portions of a section.

Referring now to the drawings, FIGS. 1, 2, 3 and 6 show a large tank of the type frequently used on railroad flat cars, the tank being generally designated by the reference numeral 1, and having a center section 2 of conventional type including a filling opening having a cover 3 thereon. The tank also includes a head 4 at each end. The lower portion of the tank includes one extruded integral-coil arcuate tank wall section generally designated by the reference numeral 10 which runs nearly the full length of the cylindrical tank and is welded to the upper circular plates 1a and 1b, which comprise the remaining portion of the tank. FIGS. 1, 2 and 3 also show a portion of a railway car structure including a center sill 5 supporting a platform 6 which in turn supports several spaced saddles which include arcuate plates 7 and 8 which plates are supported on a plurality of radially disposed bed members 9, best illustrated in FIG. 2. These members actually form no part of the present invention and are merely illustrated for the sake of showing a practical embodiment of a tank including the integral-coil heat exchange tank wall sections 10 which are the subject of the present invention.

Turning now to a discussion of the integral-coil tank wall section 10, this section appears more clearly illustrated in FIGS. 3, 4 and 6, the section including two arcuate extruded thicker portions 11 and 12 which are symmetrical about the center line C. Each of these portions is an extruded relatively thick aluminum arc having a plurality of longitudinal ducts 13 extending through the full length thereof. These two thickened portions 11 and 12 are joined together by a relatively thinner portion 14 and are also terminated by thinner edge portions 15 and 16 which, as can be seen in FIGS. 2, 4 and 6, are welded to the arcuate plate 1a comprising the upper portion of the tank 1. The radius R illustrates that this tank is circular, although the present invention is by no means limited to a tank of circular cross-section.

In FIGS. 5 and 8 this same integral tank section 10 is shown in partly-folded position in which the thinner portion 14 of the wall section is partly-folded about a small radius so as to cause the extreme ends 15 and 16 of the section 10 to approach each other. Note that both thickened portions 11 and 12 are extruded so that they need not subsequently, themselves, be bent in order to make them conform with the larger radius R of the completed tank.

In FIG. 5, a partly-folded double section 10 is shown being extruded out of an extrusion head H forming a part of an extrusion machine E, which is illustrated only schematically since the extrusion machine per se forms no part of the present invention.

In FIG. 8, a three-portion wall section is shown being extruded from the head H' of an extruder E'. In the practical embodiment of the present invention as actually manufactured, the wall section 10 extruded from the extruder is made of aluminum alloy, material ASTM B–

209 6061–T6, although the present invention is obviously not to be limited to a particular material since a great range of suitable materials is known in the prior art any one of which can be extruded in a manner satisfactory to implement the present invention.

FIG. 7 is a partial sectional view similar to that of FIG. 6 but illustrating an integral-coil wall section 20 which is generally similar to the wall section 10 except that the shape of the ducts 23 is different from the cross-sectional shape of the ducts 13. The ducts 13 have semi-circular ends separated by arcuate opposed wall portions which follow the arcuate shape of the inside of the tank 1. However, in FIG. 7 the cross-sectional shape of the ducts 23 is semi-elliptical with a 2:1 ratio, and the inside surface of these ducts are arcuate and generally follow the same contour as the arc of the tank of which they form a part. This second shape provides a somewhat stronger tank since less of the metal is omitted in the manufacture of the ducts and since the elliptical shape of the ducts is somewhat stronger than the shape shown in FIG. 6 because more of the web material between ducts remains. This modification of FIG. 7 is enclosed merely to illustrate that different shapes of ducts are contemplated and are intended to be included within the scope of this invention. These ducts could be triangular, rectangular, or circular, or even of some other irregular shape.

Returning now to a consideration of FIGS. 1, 2, 3 and 4, it will be seen that between the longitudinal ends of the extruded integral-coil wall section, there is located a manifold, best seen in FIGS. 1, 3 and 4. FIG. 3 illustrates a section through this manifold which shows that the transverse center of the wall section 10 is cut away and a bottom outlet plate 31 is welded in its place, this plate being located in the bottom of the tank and visible also in FIG. 1. This bottom plate has an outlet pipe 32 communicating through an opening 31a in the plate 31 and welded to the latter. Any suitable type of valve and coupling can be used to control the flow of liquid from the outlet pipe 32, this coupling being schematically illustrated at 33 in FIG. 1. A larger diameter pipe 34 serves to strengthen the engagement of the outlet pipe 32 with the plate 31, and access to the space between the pipes 32 and 34 is provided by two pipes generally referred to as 35, which can best be seen in FIG. 1. In the vicinity of the outlet pipe 32 there is a pair of longitudinally disposed anchor plates 36 which are secured, for example, by means of rivets 36a, to the sill channel 5, the anchor plates 36 providing additional support for the integral-coil wall section 10 in the vicinity 10x of the wall section which is cut away to insert manifold plate 31. By this means the structural strength of the wall section 10 is not materially reduced in the vicinity of the outlet pipe.

Near the center of the wall section 10 are also located inlet and outlet pipes respectively labeled 37 and 38, these pipes communicating with ducts 13 of the wall section 10. As can be best seen in FIG. 4, there is a small manifold 39 connected with the duct inlet pipe 37 and communicating with the two innermost ducts 13a and 13b, FIG. 4, these ducts carrying liquid toward the right end of the wall section 10 and toward several cross-over pipes 41 and 42 which are welded on the outside of the wall section 10 and carry liquid from the innermost ducts to the outermost ducts at the same end while bypassing the two intermediate ducts on both sides. The liquid then travels longitudinally up the outermost duct on each side of the wall section 10 and is reversed at the far end to come back down the next adjacent duct, the zig-zag flow of the fluid continuing until it enters the ducts 13c and 13d and returns to a manifold 40 which communicates with the outlet pipe 38. FIG. 4 therefore provides a flow diagram illustrating the direction of flow of the fluids within the ducts so that the flow can be followed from the inlet pipe 37 to the outlet pipe 38.

The extrusions of which the wall sections 10 are made lend themselves to a simple means for joining the ends of the ducts for the purpose of reversing the directional flow therein. For instance, the webs 44 between the adjacent ducts and separating the latter are relatively thin and can be machined away at their ends as shown at 44a in FIG. 4. If the partitions 44 are machined away at their ends, small end plugs 45 can then be inserted to close the ducts and thereby provide reversal of the flow. These partitions are preferably welded in the ends of the ducts and seal the ends against loss of fluid. Thus, a very simple and effective heat exchange structure is provided which is conveniently manufactured by the extrusion process so that any desired length of duct work can be manufactured to form a part of any particular size tank to be constructed.

The process taught by the present invention involves the extrusion of a section of tank wall having ducts provided therein, the extrusion being done with the wall sections folded toward each other about a relatively small radius so that a reasonable-size extrusion head can be used to extrude a relatively larger wall section. The wall section when extruded is then opened up to the position shown in FIG. 6 so that it conforms with the curvature of the tank of which it is to become a part, and then this integral-duct wall section 10 is welded on the plates which form the tank. Alternate partitions between the ducts are then machined away and the ducts are plugged on their ends so that a zig-zag flow is provided within the ducts. Finally, means is added for obtaining access to the bottom of the tank through the ducts by adding an outlet plate having inlet and outlet manifolds at its ends, which manifolds are connected into the ducts. This type of construction is inexpensive and quick, and makes a highly satisfactory tank, especially well adapted for use on vehicles.

The present invention is not to be limited to the exact forms shown in the drawings, for obviously changes may be made therein within the scope of the following claims.

I claim:

1. A fabricated vessel comprising plural wall plate sections secured together and including at least one heat-exchange plate section, the heat-exchange plate section comprising a one-piece extrusion having peripheral web portions, of thickness approximating the thickness of the other wall plates, said peripheral web portions bordering upon heat-exchange portions wherein the overall thickness of the extrusion is more than twice the thickness of the peripheral portions and each heat-exchange portion having a multiplicity of adjacent parallel ducts extending therethrough and separating the thicker portion of the extrusion into inner and outer walls, the said heat-exchange portions between the ducts comprising curved fileted ribs integrally joining the inner and outer walls, and each heat-exchange portion having an opening in an outer wall to expose open ends of at least one of its ducts; a manifold plate secured to the heat-exchange portion at the opening and closing the exposed duct ends and having inlet and outlet means communicating respectively with different duct ends, and said manifold plate having vessel drainage pipe means extending through it between the inlet and outlet means and passing through the inner wall of the heat-exchange section; and means for closing the ducts at the ends of the extrusion and for transversely joining some of the ducts to form a continuous tortuous path therethrough between said inlet and outlet means.

2. In a vessel as set forth in claim 1, said means for closing the ducts, wherein some of the ribs between some of the adjacent ducts are terminated short of and spaced from the end of the heat exchange portion, comprising plug means fixed in and closing the ends of such adjacent ducts and spaced from said terminated ribs.

3. In a vessel as set forth in claim 1, the heat-exchange section being at the bottom of the vessel, and means for supporting the vessel comprising saddle means shaped to conform with the shape of said outer walls and located therebelow to support the weight of the vessel distributed among said ribs and along said outer walls.

4. In a vessel as set forth in claim 1, the cross-sectional shape of said ducts being semi-cylindrical at their transverse sides, and being semi-elliptical therebetween, whereby the heat-exchange portions are strengthened by thickened ribs therebetween.

References Cited in the file of this patent

UNITED STATES PATENTS

| | | |
|---|---|---|
| 1,118,514 | Smith | Nov. 24, 1914 |
| 1,614,107 | Cleary | Jan. 11, 1927 |
| 1,685,131 | Hummer | Sept. 25, 1928 |
| 2,145,614 | Stambaugh | Jan. 31, 1939 |
| 2,190,494 | Templin | Feb. 13, 1940 |
| 2,740,269 | Buehler | Apr. 3, 1956 |
| 2,966,728 | Balfour | Jan. 3, 1961 |
| 2,966,729 | Dedrick | Jan. 3, 1961 |
| 3,086,358 | Tumavicus | Apr. 23, 1963 |

FOREIGN PATENTS

| | | |
|---|---|---|
| 221,250 | Australia | Oct. 9, 1958 |